(12) United States Patent
Ruan et al.

(10) Patent No.: US 8,902,718 B1
(45) Date of Patent: Dec. 2, 2014

(54) DISK DRIVE CALIBRATING DYNAMIC FLY HEIGHT WRITE PROFILE FOR FLY HEIGHT ACTUATOR

(71) Applicant: Western Digital Technologies, Inc., Irvine, CA (US)

(72) Inventors: Huanxiang Ruan, Irvine, CA (US); Pradeep K. Thayamballi, Fremont, CA (US); Galvin T. Chia, Rancho Santa Margarita, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/908,265

(22) Filed: Jun. 3, 2013

Related U.S. Application Data (60) Provisional application No. 61/825,641, filed on May 21, 2013.

(51) Int. Cl.
  *G11B 11/00* (2006.01)
  *G11B 21/12* (2006.01)
(52) U.S. Cl.
  CPC .................................... *G11B 21/12* (2013.01)
  USPC ...................................................... 369/13.11
(58) Field of Classification Search
  None
  See application file for complete search history.

(56) References Cited

U.S. PATENT DOCUMENTS

| | | |
|---|---|---|
| 5,392,273 A | 2/1995 | Masaki et al. |
| 5,805,559 A | 9/1998 | Murakami et al. |
| 6,046,970 A | 4/2000 | DeCusatis et al. |
| 6,359,433 B1 | 3/2002 | Gillis et al. |
| 6,417,981 B1 | 7/2002 | Smith |
| 6,636,460 B2 | 10/2003 | Akiyama et al. |
| 6,700,724 B2 | 3/2004 | Riddering et al. |
| 6,771,440 B2 | 8/2004 | Smith |
| 6,801,376 B2 | 10/2004 | Smith |
| 6,804,189 B2 | 10/2004 | Inase et al. |
| 6,883,368 B2 | 4/2005 | Smith et al. |
| 6,894,854 B1 | 5/2005 | Carlson et al. |
| 6,950,260 B2 | 9/2005 | Coffey et al. |
| 6,975,472 B2 | 12/2005 | Stover et al. |
| 7,023,647 B2 | 4/2006 | Bloodworth et al. |
| 7,068,449 B2 | 6/2006 | Riddering et al. |
| 7,095,577 B1 | 8/2006 | Codilian et al. |
| 7,099,097 B2 | 8/2006 | Hamaguchi et al. |
| 7,161,882 B2 | 1/2007 | Lehr et al. |
| 7,177,253 B2 | 2/2007 | Ishibashi et al. |
| 7,180,692 B1 | 2/2007 | Che et al. |
| 7,324,299 B1 | 1/2008 | Schreck et al. |
| 7,369,340 B1 | 5/2008 | Dang et al. |
| 7,400,473 B1 | 7/2008 | Krajnovich et al. |
| 7,412,143 B2 | 8/2008 | Rottmayer et al. |
| 7,436,620 B1 | 10/2008 | Kang et al. |
| 7,440,219 B2 | 10/2008 | Zhu et al. |

(Continued)

*Primary Examiner* — Brenda Bernardi (57) ABSTRACT

A disk drive is disclosed comprising a disk and a head actuated over the disk, the head comprising a fly height actuator (FHA). The disk drive further comprises control circuitry including disk access circuitry, wherein during a calibration operation, the disk access circuitry is configured into a calibration mode that increases a heating of the head, and a fly height of the head is measured periodically to generate periodic fly height measurements that vary due to the heating of the head. A dynamic fly height (DFH) write profile is generated based on the periodic fly height measurements. During a write operation, the disk access circuitry is configured into a write mode and a DFH control signal is generated and applied to the FHA based on the DFH write profile.

34 Claims, 8 Drawing Sheets

(56) References Cited

U.S. PATENT DOCUMENTS

| | | |
|---|---|---|
| 7,489,466 B2 | 2/2009 | Knigge et al. |
| 7,502,205 B1 | 3/2009 | Hurtado et al. |
| 7,508,617 B1 | 3/2009 | Mak et al. |
| 7,675,707 B1 | 3/2010 | Liu et al. |
| 7,724,470 B2 | 5/2010 | Poon et al. |
| 7,791,986 B2 | 9/2010 | Koyama et al. |
| 7,839,595 B1 | 11/2010 | Chue et al. |
| 7,876,655 B2 | 1/2011 | Sasaki |
| 7,898,759 B2 | 3/2011 | Matsumoto et al. |
| 7,916,420 B1 | 3/2011 | McFadyen et al. |
| 7,990,647 B2 | 8/2011 | Lille |
| 7,995,425 B2 | 8/2011 | Schreck et al. |
| 8,059,357 B1 | 11/2011 | Knigge et al. |
| 8,248,732 B2 | 8/2012 | Nishiyama et al. |
| 8,248,896 B1 | 8/2012 | Yuan et al. |
| 8,300,338 B1 | 10/2012 | McFadyen |
| 8,320,069 B1 | 11/2012 | Knigge et al. |
| 8,441,909 B1 | 5/2013 | Thayamballi et al. |
| 8,456,980 B1 | 6/2013 | Thayamballi |
| 8,619,508 B1 | 12/2013 | Krichevsky et al. |
| 2002/0136115 A1 | 9/2002 | Kadlec et al. |
| 2006/0233061 A1 | 10/2006 | Rausch et al. |
| 2007/0014041 A1 | 1/2007 | Lille et al. |
| 2007/0230012 A1 | 10/2007 | Erden et al. |
| 2007/0291401 A1 | 12/2007 | Sun et al. |
| 2008/0158730 A1 | 7/2008 | Furukawa et al. |
| 2008/0247073 A1* | 10/2008 | Park .................. 360/59 |
| 2009/0207519 A1 | 8/2009 | Erden et al. |
| 2009/0225464 A1 | 9/2009 | Juang et al. |
| 2009/0251828 A1 | 10/2009 | Schreck et al. |
| 2009/0303629 A1 | 12/2009 | Nakano et al. |
| 2010/0123967 A1 | 5/2010 | Batra et al. |
| 2010/0232050 A1 | 9/2010 | Schreck et al. |
| 2011/0090602 A1 | 4/2011 | Nishiyama et al. |
| 2011/0205861 A1 | 8/2011 | Erden et al. |
| 2011/0292773 A1 | 12/2011 | Schreck et al. |
| 2012/0188859 A1 | 7/2012 | Hara et al. |
| 2013/0077453 A1 | 3/2013 | Alex |

* cited by examiner

DISK DRIVE CALIBRATING DYNAMIC FLY HEIGHT WRITE PROFILE FOR FLY HEIGHT ACTUATOR

CROSS-REFERENCE TO RELATED APPLICATIONS

This application claims priority to provisional U.S. Patent Application Ser. No. 61/825,641, filed on May 21, 2013, which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

Data is typically written to the disk by modulating a write current in an inductive coil to record magnetic transitions onto the disk surface in a process referred to as saturation recording. During readback, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface with a laser during write operations in order to decrease the coercivity of the magnetic medium, thereby enabling the magnetic field generated by the write coil to more readily magnetize the disk surface.

Figure 1:
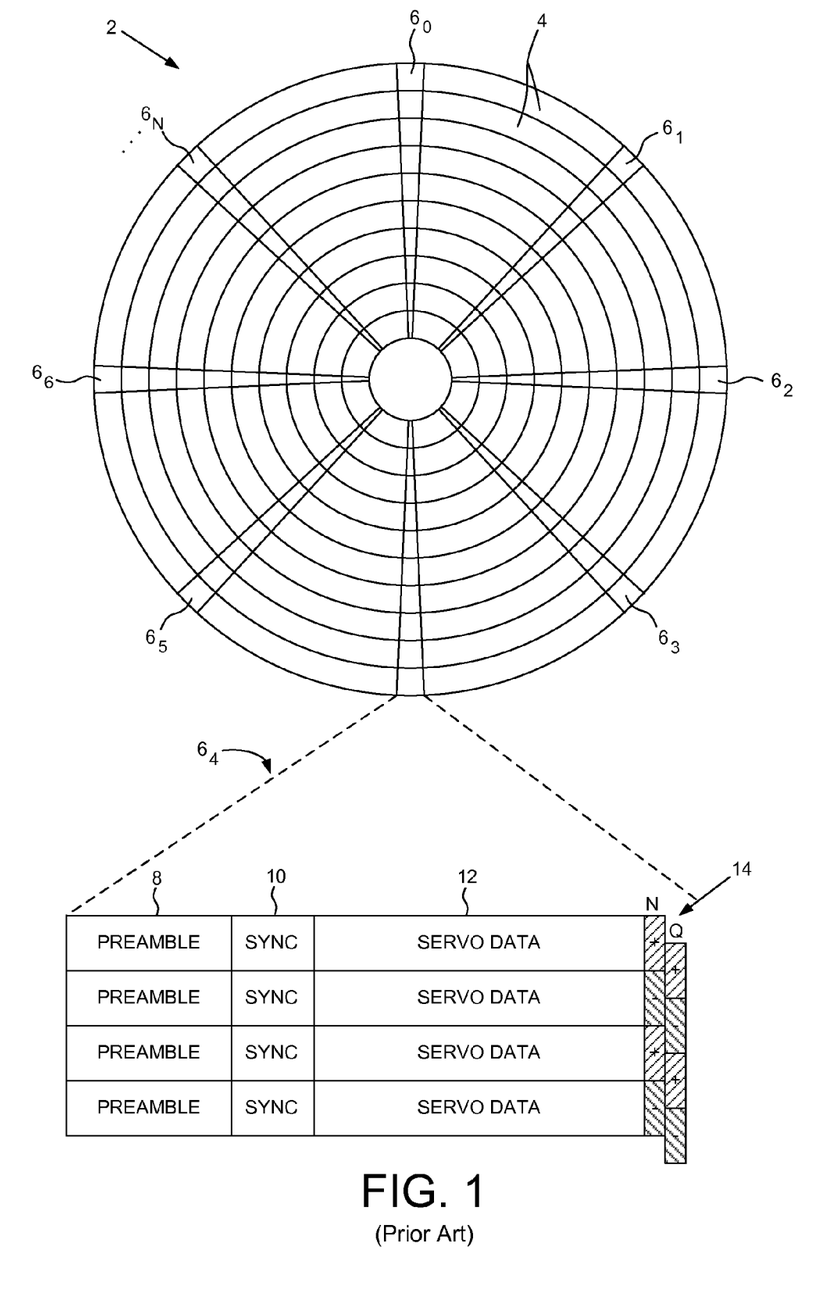
FIG. 1 shows a prior art disk format comprising a plurality of servo tracks defined by embedded servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figures 2A, 2B, 2C:
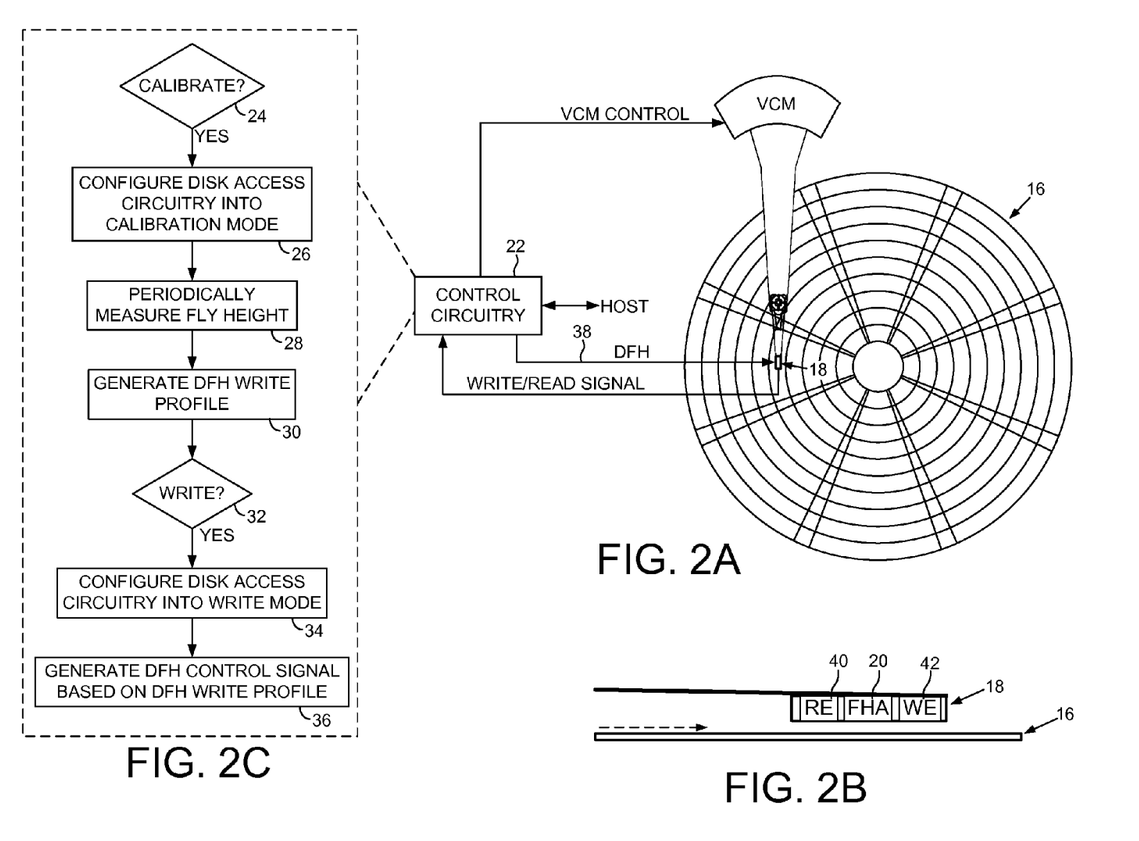
FIG. 2A shows a disk drive according to an embodiment comprising a head actuated over a disk.
FIG. 2B shows a head according to an embodiment comprising a fly height actuator.
FIG. 2C is a flow diagram according to an embodiment for generating a dynamic fly height (DFH) write profile based on fly height measurements taken during a calibration operation.

FIG. 2A shows a disk drive according to an embodiment comprising a disk 16 and a head 18 (FIG. 2B) actuated over the disk 16, the head 18 comprising a fly height actuator (FHA) 20. The disk drive further comprises control circuitry 22 including disk access circuitry, the control circuitry operable to execute the flow diagram of FIG. 2C wherein during a calibration operation (block 24), the disk access circuitry is configured into a calibration mode that increases a heating of the head (block 26), and a fly height of the head is measured periodically to generate periodic fly height measurements that vary due to the heating of the head (block 28). A dynamic fly height (DFH) write profile is generated based on the periodic fly height measurements (block 30). During a write operation (block 32), the disk access circuitry is configured into a write mode (block 34) and a DFH control signal 38 is generated and applied to the FHA based on the DFH write profile (block 36).

In the embodiment of FIG. 2B, the head 18 comprises a suitable read element 40, such as a magnetoresistive element, and a suitable write element 42, such as an inductive coil. In one embodiment, the write element 42 may be used to write a fly height pattern on the disk 16, and the head 18 used to read the fly height pattern from the disk 16 in order to generate a fly height measurement when calibrating the DFH write profile. In another embodiment, the head 18 may comprise a suitable fly height sensor, such as a magnetoresistive sensor or capacitive sensor, operable to generate a fly height signal that is processed to generate the fly height measurements when calibrating the DFH write profile.

Any suitable FHA 20 may be integrated into the head 18, such as a heater that actuates through thermal expansion, or a piezoelectric (PZT) element that actuates through mechanical deflection. In one embodiment, the FHA 20 is controlled in order to maintain a target fly height for the head 18 during write and read operations. For example, maintaining a target fly height during a write operation may help ensure the disk surface is adequately saturated by the magnetic field generated by the write element 42. However, during a write operation the head 18 typically undergoes additional thermal expansion due to a heating effect of a write component, such as a heating effect of the write element 42 and/or a heating effect of a laser used to heat the disk surface in a HAMR disk drive. To compensate for the fly height deviation due to the heating effect during a write operation, the DFH control signal 38 applied to the FHA 20 is typically reduced.

Figure 3A:
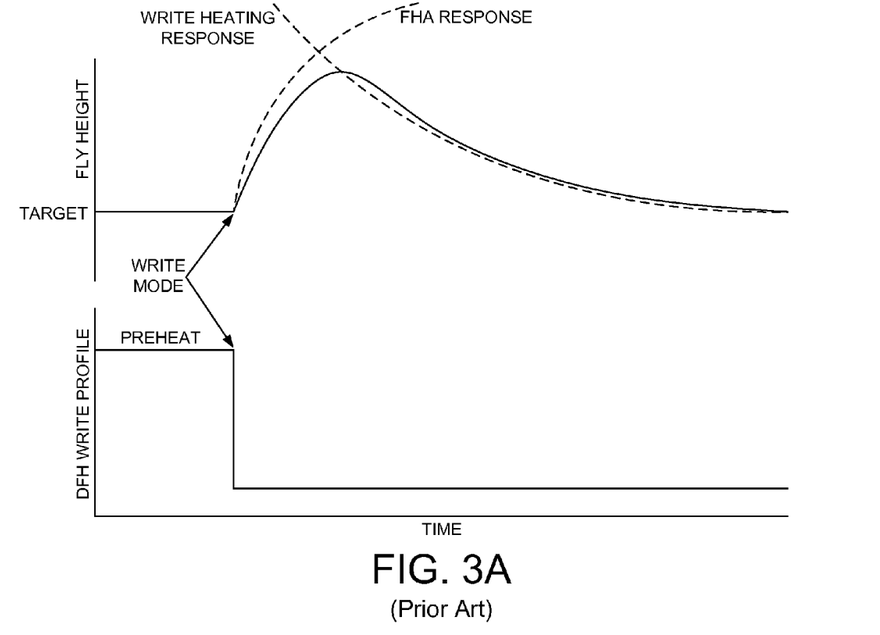
FIG. 3A shows a prior art DFH write profile comprising a step decrement in order to compensate for a heating effect of a write mode.

FIG. 3A shows a prior art DFH write profile employed during a write operation wherein the DFH control signal 38 is adjusted (e.g., increased) during a preheat interval in order to adjust the fly height of the head to the target fly height. When the disk access circuitry is configured into the write mode, the DFH control signal is decreased by a step decrement in order to compensate for the heating effect of the write mode. Employing a step decrement in the DFH write profile causes the fly height of the head to increase initially due to the cooling response of the FHA 20, and then decrease toward the target fly height as the heating response of the write mode begins to reduce the fly height as illustrated in FIG. 3A. This fly height transient at the beginning of a write operation may result in inadequate saturation of the disk surface for one or more data sectors.

Figure 3B:
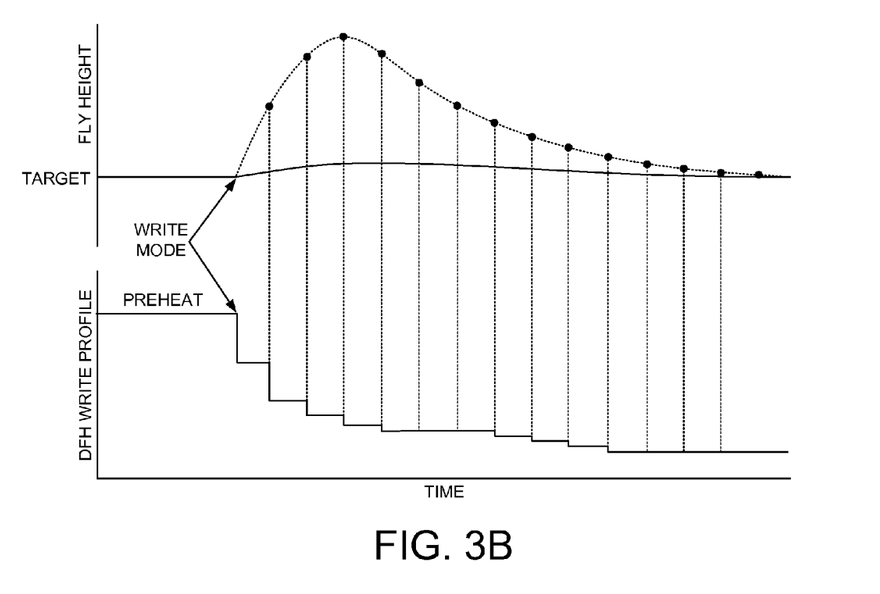
FIG. 3B shows a DFH write profile according to an embodiment to compensate for the heating effect of the write mode.

FIG. 3B illustrates an embodiment of the present invention which helps reduce the fly height transient at the beginning of a write operation due to the prior art step decrement in the DFH write profile. In this embodiment, a fly height measurement is generated periodically at the beginning of a write operation as represented by the black dots on the fly height curve of FIG. 3B. A DFH write profile is then generated based on the periodic fly height measurements. In the embodiment shown in FIG. 3B, the DFH write profile comprises a step decrement at each corresponding fly height measurement. However, any suitable DFH write profile may be generated based on the fly height measurements, where the DFH write profile may differ for different disk drive configurations, such as different head geometries, different FHA 20 response times, different write heating response times, with or without a laser for HAMR, etc.

Figure 4:
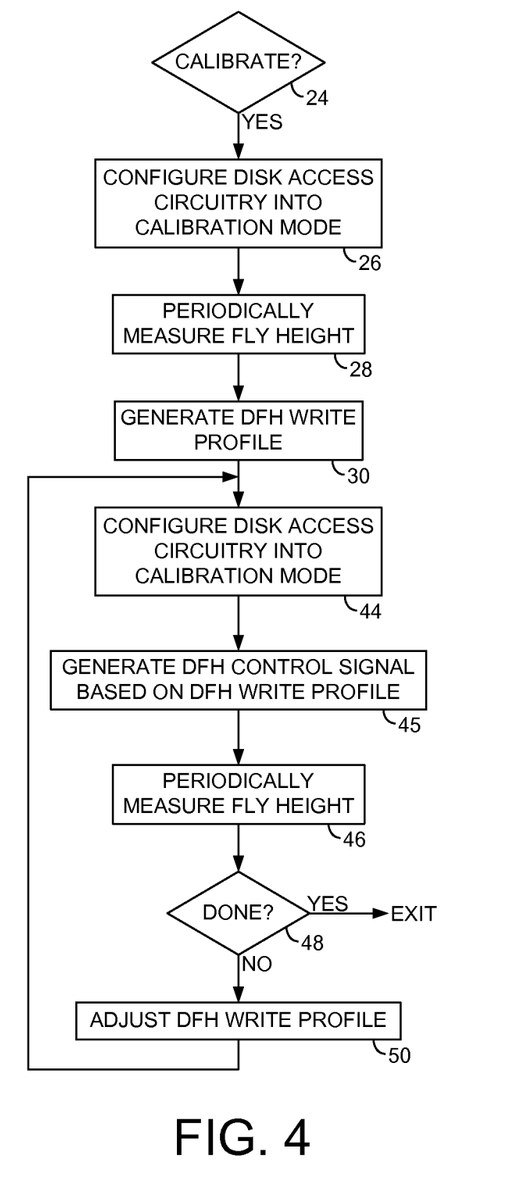
FIG. 4 is a flow diagram according to an embodiment wherein the calibration operation is iterated until the DFH write profile converges.

In one embodiment, the DFH write profile may be generated through multiple iterations until a suitable criterion has been satisfied, such as the measured fly height remaining near a target fly height at the beginning of the write mode. This embodiment is illustrated in the flow diagram of FIG. 4 which is an extension of the flow diagram of FIG. 2C, wherein after generating the initial DFH write profile (block 30), the calibration operation is repeated by configuring the disk access circuitry into the calibration mode (block 44) and generating a fly height measurement periodically (block 46) while applying the initial DFH write profile to the FHA (block 45). A criterion is then evaluated (block 48) to determine whether the initial DFH write profile adequately compensated for the fly height transient. For example, the fly height measurements may be evaluated to determine whether they remain at a target fly height within a predetermined tolerance, or whether a derivative of the fly height measurements falls below a threshold, or whether a derivative of the DFH write profile falls below a threshold, etc. If the criterion is not met at block 48, then the DFH write profile is adjusted based on the fly height measurements (block 50) and the flow diagram is repeated from block 44 until the criterion is satisfied at block 48.

The disk access circuitry may be configured into the calibration mode at step 26 of FIG. 2C in any suitable manner. In one embodiment, the calibration mode at step 26 is the same as the write mode at step 34, such as applying a write level current to the write element 42 and optionally applying a write level power to a laser for HAMR. In another embodiment, a lower level write current and/or a lower level laser power may be employed when calibrating the DFH write profile. In general, the disk access circuitry is configured into the calibration mode in order to increase the heating of the head 18 similar to a normal write operation so that the DFH write profile may be calibrated.

Figure 5:
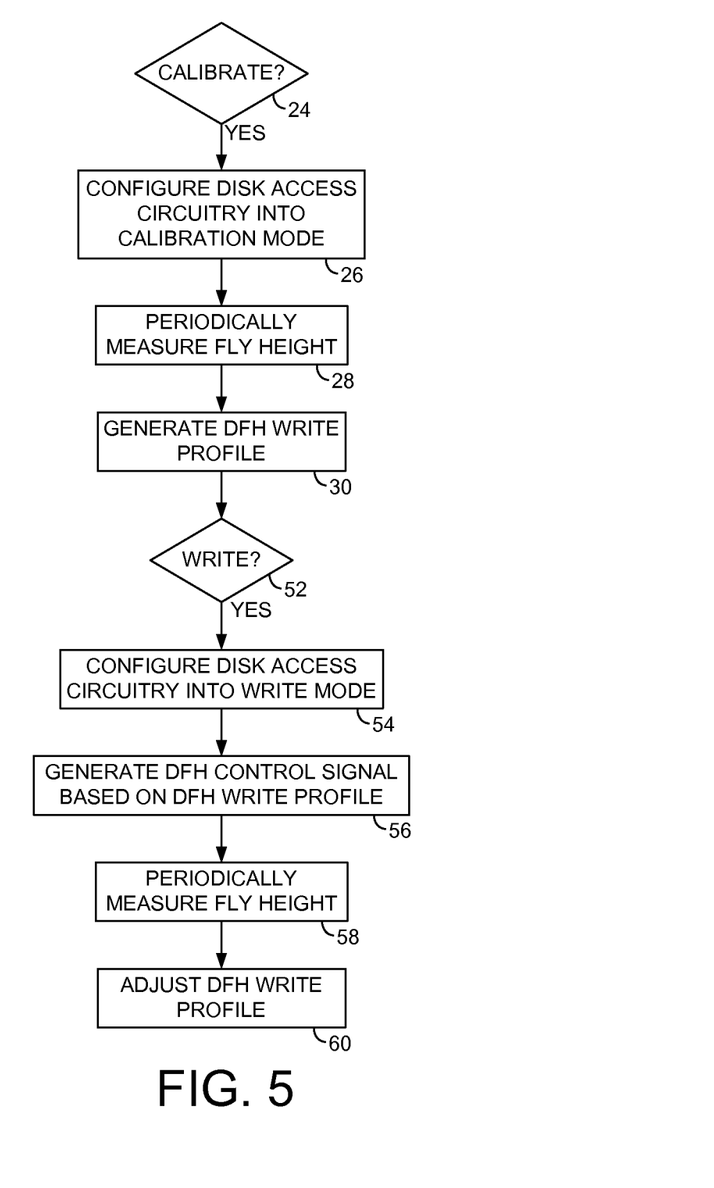
FIG. 5 is a flow diagram according to an embodiment wherein the DFH write profile may be adjusted during a normal write operation.

In one embodiment, the DFH write profile is calibrated by executing the flow diagram of FIG. 2C, for example, as part of a manufacturing process before the disk drives are deployed in the field. FIG. 5 is a flow diagram according to an embodiment which extends on the flow diagram of FIG. 2C, wherein when a normal write operation is executed while the disk drive is deployed in the field (block 52), the disk access circuitry is configured into the write mode (block 54) and the DFH control signal 38 is generated based on the DFH write profile (block 56). During the beginning of the write operation, the fly height measurements are periodically generated (block 58), and the fly height measurements are used to adjust the DFH write profile (block 60). In this manner, the DFH write profile may be adjusted over the life of the disk drive which may help compensate for changes that occur over time, such as changes to the thermal response time of the FHA or other write components.

Figure 6:
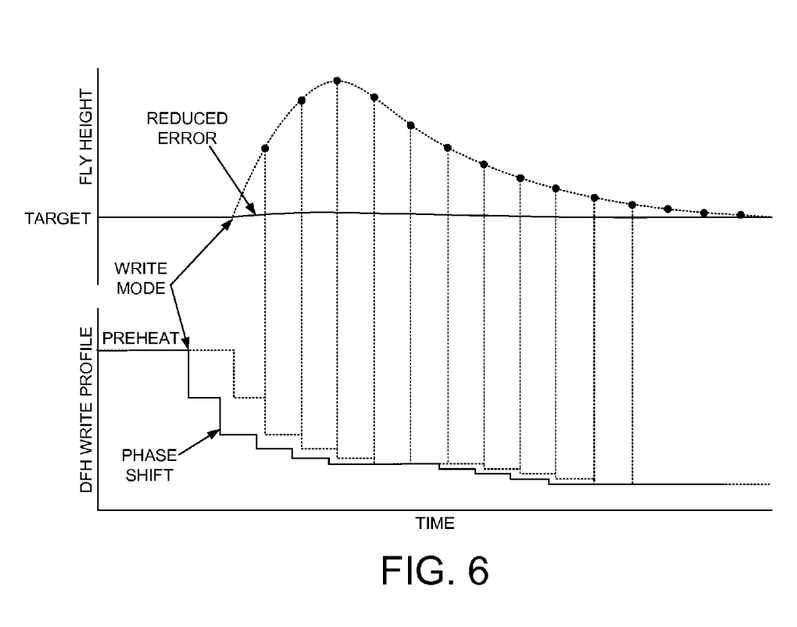
FIG. 6 shows an embodiment wherein the DFH write profile is phase shifted to compensate for a thermal response of the fly height actuator.

The DFH write profile may be generated in any suitable manner based on the periodic fly height measurements as shown in FIG. 3B. In one embodiment, the values in the DFH write profile are generated and optionally adapted based on the magnitude of each fly height measurement. As described above, the values of the DFH write profile may be adapted based on the subsequent magnitude of the fly height measurements until the magnitude of the fly height measurements reach a target fly height within a predetermined tolerance. In one embodiment, the values of the DFH write profile may also be generated based on a phase of the fly height measurements. For example, in one embodiment the delayed thermal response of the FHA 20 (transient response) may be taken into account when generating the DFH write profile by phase shifting the DFH write profile as illustrated in FIG. 6. Inducing a phase shift in the DFH write profile may help reduce the fly height error as compared to FIG. 3B, wherein in one embodiment the phase shift may be induced explicitly or it may be an inherent result of adjusting the magnitude of the DFH write profile values over time.

Figure 7:
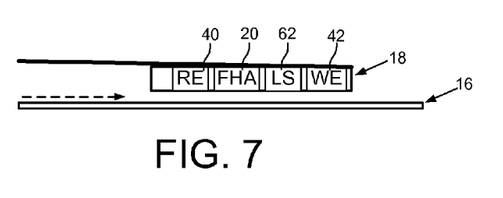
FIG. 7 shows a head according to an embodiment comprising a laser for heating the disk during a write operation.

FIG. 7 shows an embodiment wherein the head 18 comprises a laser 62 used to heat the disk surface during write operations in a HAMR disk drive. Any suitable laser 62 may be employed, such as a laser diode, together with suitable optics for focusing the laser light onto the disk surface, such as a wave guide and a near field transducer (NFT). In one embodiment, the laser power may be increased during the preheat interval shown in FIG. 6 in order to reduce the fly height transient after transitioning in to the write mode. In one embodiment, both the FHA 20 and the laser 62 may be controlled during the preheat interval to adjust the head toward the target fly height prior to transitioning into the write mode.

Figure 8:
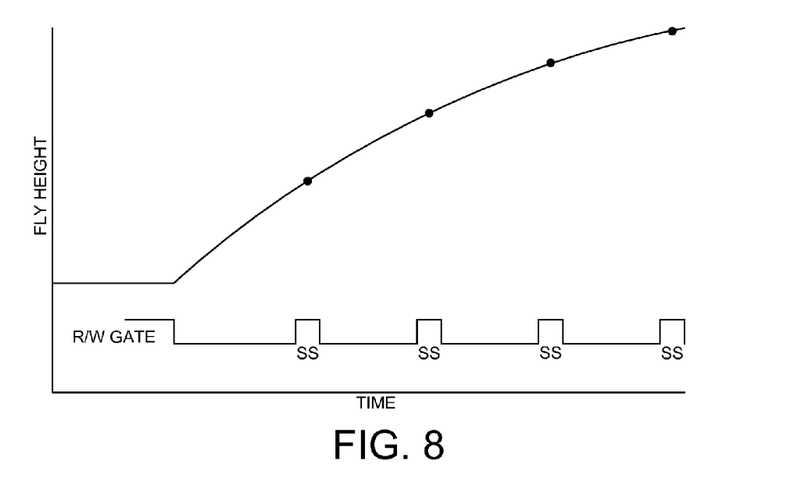
FIG. 8 shows an embodiment wherein a fly height measurement is taken at each servo sector.

When initially calibrating and/or adapting the DFH write profile, the fly height measurements may be generated periodically in any suitable manner. FIG. 8 shows an embodiment wherein a fly height measurement may be generated while reading a fly height pattern from each servo sector of a servo track. Each servo sector may comprise a dedicated field for storing the fly height pattern, or the fly height pattern may be based on an existing field, such as a preamble or a servo burst field. In one embodiment, the fly height pattern comprises a periodic pattern and the fly height measurement is generated based on a harmonic ratio technique (Wallace spacing equation) that measures an absolute head-media spacing (HMS)

according to the ratio of the amplitude of the read signal at two different harmonics. In one embodiment, the fly height measurements generated at each servo sector as shown in FIG. 8 may be interpolated in order to increase the resolution of the measurements and the corresponding resolution of the DFH write profile. In another embodiment, the DFH write profile values may be interpolated to increase the resolution of the adjustments made to the DFH control signal.

Figure 9:
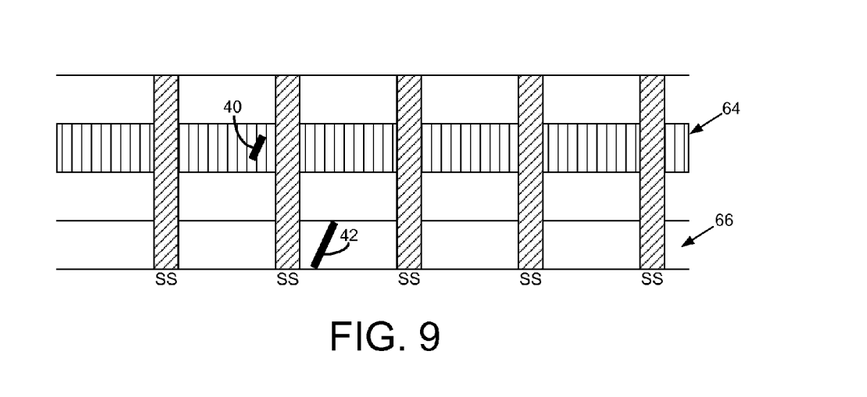
FIG. 9 shows an embodiment wherein during the calibration operation a fly height pattern is read from a first data track while writing data to a second data track.

FIG. 9 illustrates another embodiment wherein the disk comprises a plurality of data tracks, and the head comprises a read element 40 radially offset from a write element 42 by at least one data track. When calibrating the DFH write profile, the control circuitry 22 is operable to read data from a first data track 64 to measure the fly height of the head while the write element 42 is over a second data track 66. In this manner, the disk access circuitry may be configured into the calibration mode (e.g., write mode) while simultaneously reading the data (e.g., fly height pattern) from the first data track 64. Because the write element 42 is radially offset from the read element 40, the data recorded in the first data track 64 is not erased by the write element 42. This enables the control circuitry 22 to generate a fly height measurement at any desired resolution along the first data track, and thereby generate a corresponding DFH write profile at any suitable resolution.

In one embodiment, the control circuitry may receive two or more host write commands for writing data to the same data track with a gap between the write operations. This illustrated in FIG. 10B wherein the control circuitry may execute a first write operation during a first interval, wait a second interval for the disk to spin, and then execute a second write operation. If the second interval is relatively short, the head 18 may not fully cool to a steady state before executing the second write operation. Therefore, when a DFH write profile is calibrated for a fully cooled head, the DFH write profile may not be optimum when executing a second write operation after a short gap since the write heating response shown in FIG. 3A will be different. In one embodiment, the DFH write profile for a gapped write operation may be generated by modifying the DFH write profile for a non-gapped write operation, such as by modifying the magnitude and/or phase of a non-gapped DFH write profile based on the length of the gap.

Figure 10A:
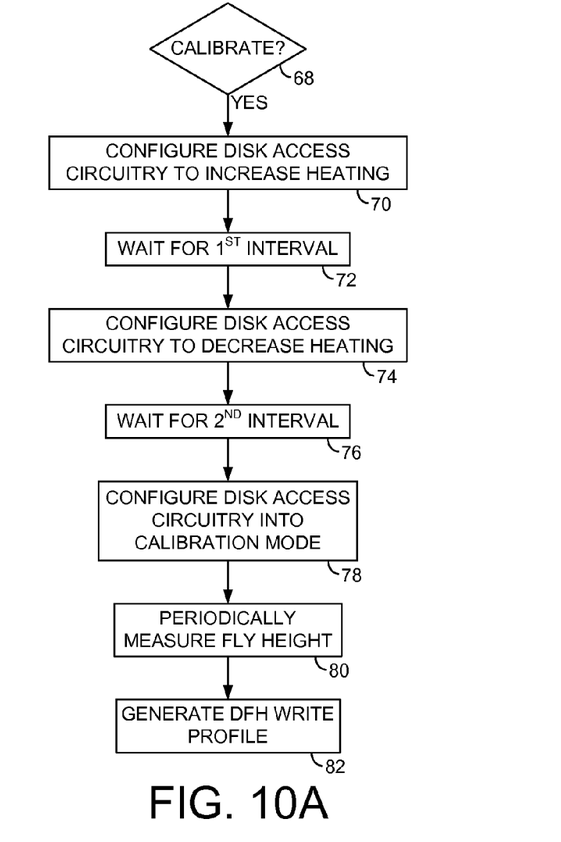
FIGS. 10A and 10B illustrate an embodiment where a DFH write profile may be calibrated for a gapped write operation.
Figure 10B:
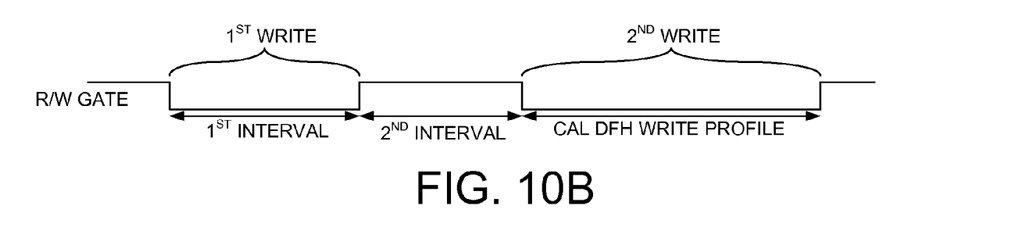

In another embodiment, the DFH write profile may be calibrated for a gapped write operation for different gap lengths, and then the calibrated DFH write profile is used to execute a gapped write operation. This embodiment is understood with reference to the flow diagram of FIG. 10A, wherein when calibrating a DFH write profile (block 68), the disk access circuitry is configured into the calibration mode to increase the heating of the head (block 70) for a first interval representing a first write operation (block 72). The disk access circuitry is then configured to decrease the heating of the head (block 74) for a second interval representing a gap between the first write operation and a second write operation (block 76) as illustrated in FIG. 10B. The disk access circuitry is again configured into the calibration mode to increase the heating of the head (block 78) and a fly height measurement is periodically measured (block 80). A DFH write profile for the gap corresponding to the second interval is then generated based on the fly height measurements. The flow diagram of FIG. 10A may be repeated for a number of different gap lengths in order to generate a corresponding number of DFH write profiles. During normal operation, when a gapped write operation is detected, the corresponding gapped DFH write profile is selected to execute the gapped write operation. Similar to the embodiment described above with reference to FIG. 5, the gapped DFH write profiles may be further adapted when executing gapped write operations during normal operation of the disk drive.

In one embodiment, the control circuitry 22 of FIG. 2A may comprise a servo control system that dynamically controls the fly height of the head based on a measured topography of the disk surface. The servo control system may employ feedback control and/or feed-forward control which adjusts the DFH control signal 38 in real time so that the fly height follows the topography of the disk surface during access operations. In one embodiment, the DFH write profile described above is injected into this servo control system as a feed-forward control signal so that the head follows the topography of the disk surface in addition to compensating for the thermal response of the head 18 and the FHA 20 at the beginning of a write operation.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
a disk;
a head actuated over the disk, the head comprising a fly height actuator; and
control circuitry including disk access circuitry, the control circuitry operable to:
during a calibration operation, configure the disk access circuitry into a calibration mode that increases a heating of the head, and periodically measure a fly height of the head to generate periodic fly height measurements that vary due to the heating of the head;
generate a dynamic fly height (DFH) write profile based on the periodic fly height measurements; and
during a write operation, configure the disk access circuitry into a write mode and generate a DFH control signal applied to the fly height actuator based on the DFH write profile,
wherein the head further comprises a laser operable to heat the disk during the write operation, and the control circuitry is operable to configure the disk access circuitry into the calibration mode by applying a write power to the laser.

2. The disk drive as recited in claim 1, wherein the calibration mode is the same as the write mode.

3. The disk drive as recited in claim 1, wherein the control circuitry is operable to configure the disk access circuitry into the calibration mode by applying a write current to a write element.

4. The disk drive as recited in claim 1, wherein the control circuitry is operable to generate the DFH write profile based on a magnitude of the periodic fly height measurements.

5. The disk drive as recited in claim 1, wherein the control circuitry is operable to generate the DFH write profile based on a phase of the periodic fly height measurements.

6. The disk drive as recited in claim 1, wherein the control circuitry is further operable to repeat the calibration operation and adjust the DFH write profile until the periodic fly height measurements substantially match a target fly height.

7. The disk drive as recited in claim 1, wherein the control circuitry is further operable to:
during the write operation, periodically measure the fly height of the head to generate write fly height measurements; and
adjust the DFH profile based on the write fly height measurements.

8. The disk drive as recited in claim 1, wherein the disk comprises a plurality of servo sectors and the control circuitry is operable to:
configure the disk access circuitry into a read mode prior to reading a first servo sector; and
measure the fly height of the head by reading data recorded in the first servo sector.

9. The disk drive as recited in claim 1, wherein:
the disk comprises a plurality of data tracks;
the head comprises a read element radially offset from a write element by at least one data track; and
during the calibration operation, the control circuitry is operable to read data from a first data track to measure the fly height of the head while the write element is over a second data track.

10. The disk drive as recited in claim 9, wherein:
the disk access circuitry comprises write circuitry; and
during the calibration operation, the control circuitry is operable to read the data from the first data track to measure the fly height of the head while at least part of the write circuitry is enabled.

11. The disk drive as recited in claim 1, wherein prior to the calibration operation the control circuitry is further operable to:
configure the disk access circuitry to increase the heating of the head for a first interval; and
after the first interval, configure the disk access circuitry to decrease the heating of the head for a second interval.

12. The disk drive as recited in claim 11, wherein the second interval corresponds to a gap between a first write operation and a second write operation.

13. A method of operating a disk drive comprising a disk, a head actuated over the disk, the head comprising a fly height actuator, and control circuitry including disk access circuitry, the method comprising:
during a calibration operation, configuring the disk access circuitry into a calibration mode that increases a heating of the head, and periodically measure a fly height of the head to generate periodic fly height measurements that vary due to the heating of the head;
generating a dynamic fly height (DFH) write profile based on the periodic fly height measurements; and
during a write operation, configuring the disk access circuitry into a write mode and generate a DFH control signal applied to the fly height actuator based on the DFH write profile,
wherein the head further comprises a laser operable to heat the disk during the write operation, and the method further comprises configuring the disk access circuitry into the calibration mode by applying a write power to the laser.

14. The method as recited in claim 13, wherein the calibration mode is the same as the write mode.

15. The method as recited in claim 13, further comprising configuring the disk access circuitry into the calibration mode by applying a write current to a write element.

16. The method as recited in claim 13, further comprising generating the DFH write profile based on a magnitude of the periodic fly height measurements.

17. The method as recited in claim 13, further comprising generating the DFH write profile based on a phase of the periodic fly height measurements.

18. The method as recited in claim 13, further comprising repeating the calibration operation and adjusting the DFH write profile until the periodic fly height measurements substantially match a target fly height.

19. The method as recited in claim 13, further comprising:
during the write operation, periodically measuring the fly height of the head to generate write fly height measurements; and
adjusting the DFH profile based on the write fly height measurements.

20. The method as recited in claim 13, wherein the disk comprises a plurality of servo sectors and the method further comprises:
configuring the disk access circuitry into a read mode prior to reading a first servo sector; and
measuring the fly height of the head by reading data recorded in the first servo sector.

21. The method as recited in claim 13, wherein:
the disk comprises a plurality of data tracks;

the head comprises a read element radially offset from a write element by at least one data track; and during the calibration operation, the method further comprises reading data from a first data track to measure the fly height of the head while the write element is over a second data track.

22. The method as recited in claim 21, wherein:

the disk access circuitry comprises write circuitry; and during the calibration operation, the method comprises reading the data from the first data track to measure the fly height of the head while at least part of the write circuitry is enabled.

23. The method as recited in claim 13, wherein prior to the calibration operation the method further comprises:

configuring the disk access circuitry to increase the heating of the head for a first interval; and after the first interval, configuring the disk access circuitry to decrease the heating of the head for a second interval.

24. The method as recited in claim 23, wherein the second interval corresponds to a gap between a first write operation and a second write operation.

25. A disk drive comprising:

a disk;

a head actuated over the disk, the head comprising a fly height actuator; and control circuitry including disk access circuitry, the control circuitry operable to:

during a calibration operation, configure the disk access circuitry into a calibration mode that increases a heating of the head, and periodically measure a fly height of the head to generate periodic fly height measurements that vary due to the heating of the head;

generate a dynamic fly height (DFH) write profile based on the periodic fly height measurements; and during a write operation, configure the disk access circuitry into a write mode and generate a DFH control signal applied to the fly height actuator based on the DFH write profile, wherein the control circuitry is operable to generate the DFH write profile based on a phase of the periodic fly height measurements.

26. A method of operating a disk drive comprising a disk, a head actuated over the disk, the head comprising a fly height actuator, and control circuitry including disk access circuitry, the method comprising:

during a calibration operation, configuring the disk access circuitry into a calibration mode that increases a heating of the head, and periodically measure a fly height of the head to generate periodic fly height measurements that vary due to the heating of the head;

generating a dynamic fly height (DFH) write profile based on the periodic fly height measurements;

during a write operation, configuring the disk access circuitry into a write mode and generate a DFH control signal applied to the fly height actuator based on the DFH write profile; and generating the DFH write profile based on a phase of the periodic fly height measurements.

27. A disk drive comprising:

a disk;

a head actuated over the disk, the head comprising a fly height actuator; and control circuitry including disk access circuitry, the control circuitry operable to:

during a calibration operation, configure the disk access circuitry into a calibration mode that increases a heating of the head, and periodically measure a fly height of the head to generate periodic fly height measurements that vary due to the heating of the head;

generate a dynamic fly height (DFH) write profile based on the periodic fly height measurements;

during a write operation, configure the disk access circuitry into a write mode and generate a DFH control signal applied to the fly height actuator based on the DFH write profile; and repeat the calibration operation and adjust the DFH write profile until the periodic fly height measurements substantially match a target fly height.

28. A method of operating a disk drive comprising a disk, a head actuated over the disk, the head comprising a fly height actuator, and control circuitry including disk access circuitry, the method comprising:

during a calibration operation, configuring the disk access circuitry into a calibration mode that increases a heating of the head, and periodically measure a fly height of the head to generate periodic fly height measurements that vary due to the heating of the head;

generating a dynamic fly height (DFH) write profile based on the periodic fly height measurements;

during a write operation, configuring the disk access circuitry into a write mode and generate a DFH control signal applied to the fly height actuator based on the DFH write profile; and repeating the calibration operation and adjusting the DFH write profile until the periodic fly height measurements substantially match a target fly height.

29. A disk drive comprising:

a disk;

a head actuated over the disk, the head comprising a fly height actuator; and control circuitry including disk access circuitry, the control circuitry operable to:

during a calibration operation, configure the disk access circuitry into a calibration mode that increases a heating of the head, and periodically measure a fly height of the head to generate periodic fly height measurements that vary due to the heating of the head;

generate a dynamic fly height (DFH) write profile based on the periodic fly height measurements; and during a write operation, configure the disk access circuitry into a write mode and generate a DFH control signal applied to the fly height actuator based on the DFH write profile, wherein:

the disk comprises a plurality of data tracks;

the head comprises a read element radially offset from a write element; and during the calibration operation, the control circuitry is operable to read data from a first data track to measure the fly height of the head while the write element is over a second data track.

30. The disk drive as recited in claim 29, wherein:

the disk access circuitry comprises write circuitry; and during the calibration operation, the control circuitry is operable to read the data from the first data track to measure the fly height of the head while at least part of the write circuitry is enabled.

31. A method of operating a disk drive comprising a disk, a head actuated over the disk, the head comprising a fly height actuator, and control circuitry including disk access circuitry, the method comprising:

during a calibration operation, configuring the disk access circuitry into a calibration mode that increases a heating of the head, and periodically measure a fly height of the head to generate periodic fly height measurements that vary due to the heating of the head;

generating a dynamic fly height (DFH) write profile based on the periodic fly height measurements; and during a write operation, configuring the disk access circuitry into a write mode and generate a DFH control signal applied to the fly height actuator based on the DFH write profile, wherein:
- the disk comprises a plurality of data tracks;
- the head comprises a read element radially offset from a write element; and
- during the calibration operation, the method further comprises reading data from a first data track to measure the fly height of the head while the write element is over a second data track.

32. The method as recited in claim 31, wherein:
the disk access circuitry comprises write circuitry; and
during the calibration operation, the method comprises reading the data from the first data track to measure the fly height of the head while at least part of the write circuitry is enabled.

33. A disk drive comprising:
a disk;
a head actuated over the disk, the head comprising a fly height actuator; and
control circuitry including disk access circuitry, the control circuitry operable to:
- during a calibration operation, configure the disk access circuitry into a calibration mode that increases a heating of the head, and periodically measure a fly height of the head to generate periodic fly height measurements that vary due to the heating of the head;
- generate a dynamic fly height (DFH) write profile based on the periodic fly height measurements; and
- during a write operation, configure the disk access circuitry into a write mode and generate a DFH control signal applied to the fly height actuator based on the DFH write profile, wherein prior to the calibration operation the control circuitry is further operable to:
- configure the disk access circuitry to increase the heating of the head for a first interval; and
- after the first interval, configure the disk access circuitry to decrease the heating of the head for a second interval.

34. A method of operating a disk drive comprising a disk, a head actuated over the disk, the head comprising a fly height actuator, and control circuitry including disk access circuitry, the method comprising:
- during a calibration operation, configuring the disk access circuitry into a calibration mode that increases a heating of the head, and periodically measure a fly height of the head to generate periodic fly height measurements that vary due to the heating of the head;
- generating a dynamic fly height (DFH) write profile based on the periodic fly height measurements; and
- during a write operation, configuring the disk access circuitry into a write mode and generate a DFH control signal applied to the fly height actuator based on the DFH write profile, wherein prior to the calibration operation the method further comprises:
- configuring the disk access circuitry to increase the heating of the head for a first interval; and
- after the first interval, configuring the disk access circuitry to decrease the heating of the head for a second interval.

* * * * *